I. M. MILLBANK.
Cartridge.

No. 93,546.                                    Patented Aug. 10, 1869.

UNITED STATES PATENT OFFICE.

ISAAC M. MILBANK, OF GREENFIELD HILL, CONNECTICUT.

IMPROVEMENT IN METALLIC CARTRIDGES.

Specification forming part of Letters Patent No. 93,546, dated August 10, 1869.

*To all whom it may concern:*

Be it known that I, ISAAC M. MILBANK, of Greenfield Hill, in the county of Fairfield and State of Connecticut, have invented and made a new and useful Improvement in Cartridges for Breech-Loading Fire-Arms; and I do hereby declare the following to be a full, clear, and exact description of the said invention, reference being had to the annexed drawing, making part of this specification, wherein—

Figure 1:
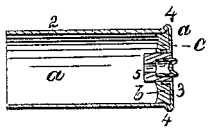
Figure 2:
Figure 3:

Figure 1 is a vertical section of the cartridge-case complete. Fig. 2 is the ring of solder or alloy separately, and Fig. 3 is a section and end view of the primer-socket.

Similar letters apply to the same parts.

In Letters Patent granted to me August 6, 1867, a cartridge-case is set forth with an interior metallic base soldered into the sheet-metal case. In my present invention the base of the sheet-metal cartridge-case is strengthened by solder, or similar alloy or metal, melted into the said case, so as to flow into intimate contact with the same and form an interior support; and I also make use of a socket for receiving the fulminate or cap, said socket being a separate piece secured into the case by the metal melted around it.

In the drawing, $a$ represents the cartridge-case of sheet metal, 2 being the cylindrical portion, 3 the base, and 4 the flange.

The flange 4 is filled with an alloy or metal, and the case strengthened in the flat base and around the rim by such metal or alloy being melted within said case in the presence of muriate of zinc or any other flux that will cause the proper union of the metals, and I find it most convenient to cut out disks or rings $b$ of solder from sheet metal, and drop them into the case in the presence of a flux, and then set the shells upon a heated plate until the metal melts and unites with the interior of the shell $a$, strengthening the same at the base, so that the base will not be liable to split by the force of the explosion, and the base will be supported against the blow of the hammer on the fulminate.

The socket $c$ is made of a short piece of tubing, with an inward flange or contraction at 5, against which the open end of the primer or cap rests, so that said primer will not be driven into the cartridge by the blow of the hammer. This socket $c$ is introduced through an opening made in the base of the cartridge-case $a$, the metal being pressed inward so as to form a short cylinder for receiving the said socket $c$, and the solder or alloy melted into the base also unites with the exterior of the socket $c$, holding the same firmly to place.

This manner of strengthening the base by the metal melted within the case may be employed in cartridges where the cavity or space for receiving the fulminate is made in some other way than by the socket $c$, and said socket $c$ might be employed with a metal base introduced within the case, as in my aforesaid patent.

It will be evident that the sheet metal forming the base of the cartridge-case might be pressed inward to form a teat or cylinder for receiving the primer, and the base strengthened by a ring of solder or other alloy melted into the space between said teat and the sides of the shell.

I do not herein claim soldering in a separate disk of metal within the cartridge-case, the same being the subject set forth in my patent before named; neither do I claim a metal base connected to a sheet-metal cylinder, and having a cavity for a primer.

What I claim, and desire to secure by Letters Patent, is—

1. A sheet-metal cartridge-case in which the base is strengthened and stiffened by the metal itself—that is, melted to cause it to flow into intimate contact with the sheet metal of said case, as set forth.

2. A tubular socket for the fulminate or cap, extending inward from the center of the sheet-metal base of the case, when combined with the metal melted around such socket, and within the base of the metallic case, for the purposes set forth.

In witness whereof I have hereunto set my signature this 16th day of April, 1869.

I. M. MILBANK.

Witnesses:
   CHAS. H. SMITH,
   GEO. T. PINCKNEY.